United States Patent

[11] 3,552,675

| [72] | Inventor | Kenneth Patrick Morritt<br>Falmouth, Cornwall, England |
|---|---|---|
| [21] | Appl. No. | 742,883 |
| [22] | Filed | July 5, 1968 |
| [45] | Patented | Jan. 5, 1971 |
| [73] | Assignee | K. P. Morritt Limited<br>Falmouth, Cornwall, England<br>a company of Great Britain and Northern Ireland |
| [32] | Priority | July 4, 1967, Mar. 1, 1968 |
| [33] | | Great Britain |
| [31] | | Nos. 30657/67 and 10190/68 |

[54] CLOSED FACE FISHING REEL
6 Claims, 7 Drawing Figs.

| [52] | U.S. Cl. | 242/84.21 |
|---|---|---|
| [51] | Int. Cl. | A01k 89/00 |
| [50] | Field of Search | 242/84.2, 84.2A, 84.2F, 84.2G, 84.2H, 82.21, 84.21A |

[56] References Cited
UNITED STATES PATENTS

| 2,613,468 | 10/1952 | Hand | 242/84.21(A) |
|---|---|---|---|
| 3,059,872 | 10/1962 | Griffis | 242/84.2(A) |
| 3,093,340 | 6/1963 | Mauborene | 242/84.21(A) |
| 3,120,357 | 2/1964 | Wood, Jr. | 242/84.21(A)X |
| 3,143,315 | 8/1964 | Harrington et al. | 242/84.21(A)X |
| 3,322,370 | 5/1967 | Siegrist | 242/84.21(A) |

*Primary Examiner*—Billy S. Taylor
*Attorney*—Jecies and Greenside

ABSTRACT: A closed-face fishing reel has a rotatable cowl which is constrained to rotate in unison with a rotatable line pickup. The cowl surrounds and protects both the line pickup and the spool and is provided in its endwall with a line guide which is disposed on the common axis of rotation of both the spool and the line pickup. Means may be provided for superimposing a reciprocatory movement on the rotation of the line pickup to provide for uniform distribution of the line convolutions over the axial length of the spool.

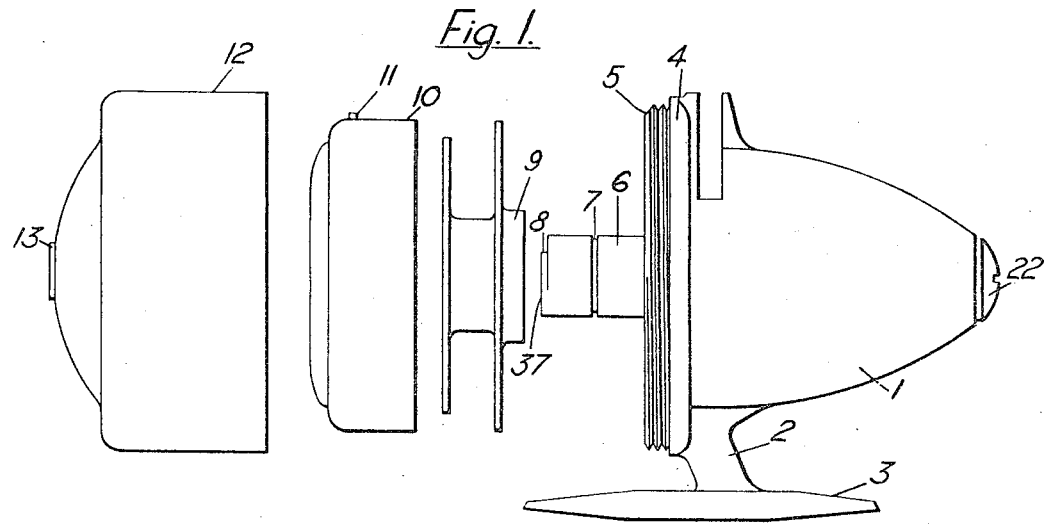
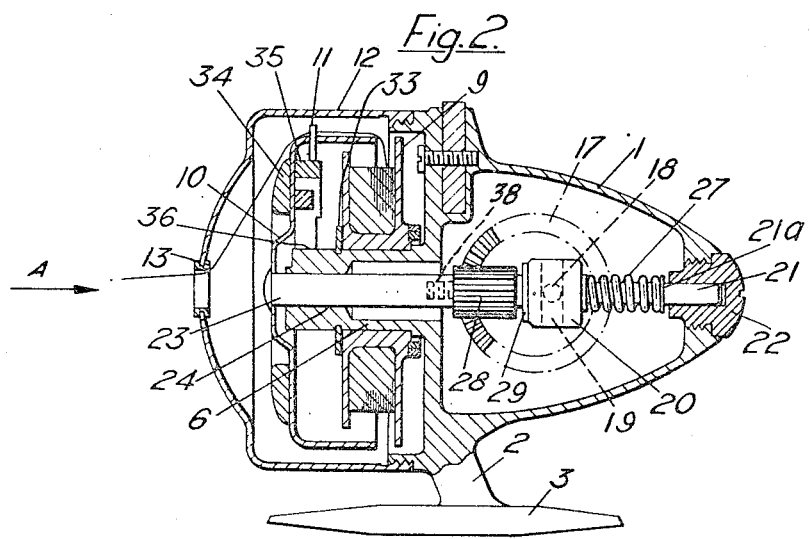
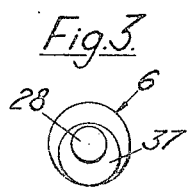

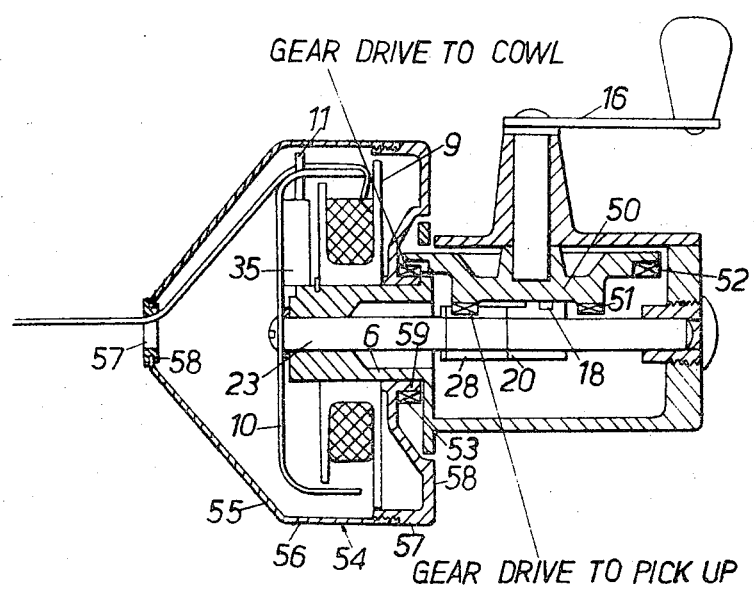

CLOSED FACE FISHING REEL

BACKGROUND OF THE INVENTION

In fishing reel, it is desirable to distribute line on a spool so that an approximately cylindrical envelope is occupied by line at all times. This helps evenness in casting and ensures that a maximum of line can be accommodated on a spool of given size. But many reels of this type had no means for distributing line axially on the spool, and those which had have been concerned only to provide a reel in which the spool reciprocates along its axis while the pickup remains axially unchanged in position while it rotates. These latter attempts have involved difficulties which the present invention seeks to overcome.

There is also the problem of disposing the pickup member so that during casting it does not interfere with the free running of the line. In the case that the spool reciprocates axially, casting when the spool was in a position close to the pickup means could cause the line to drag hard over the pickup means.

In a proposal shown in United Kingdom Pat. No. 859,107 a rotatable pickup member and a spool execute relative axial reciprocation. But here it is the spool which reciprocates axially while the pickup member rotates without axial reciprocation. The pickup member of this United Kingdom patent may be pushed to a forward position to cause automatic retraction of a pickup pin but the mechanism provided for doing this is one entirely independent of the mechanism for causing axial reciprocation of the spool. A braking ring is also provided forward of the pickup member but this is not a ring actually on the front face of the pickup member but is a separate washer-like construction which is spring-mounted upon the stem which bears the pickup member.

The arrangement according to the present invention is concerned to cut down on the multiplicity of moving parts and of separate mechanical linkages which are disclosed in that United Kingdom Patent Specification.

According to one aspect of the present invention, there is provided a closed-face fishing reel in which the pickup member is reciprocated in directions axial of the spool while it is rotated about that axis, to distribute line upon the spool.

Particular embodiments of the invention will now be described with reference to the accompanying drawings wherein:

FIG. 1 is a side view of parts of the embodiment in exploded relation,

FIG. 2 is a diametrical section through the embodiment,

Figure 4:
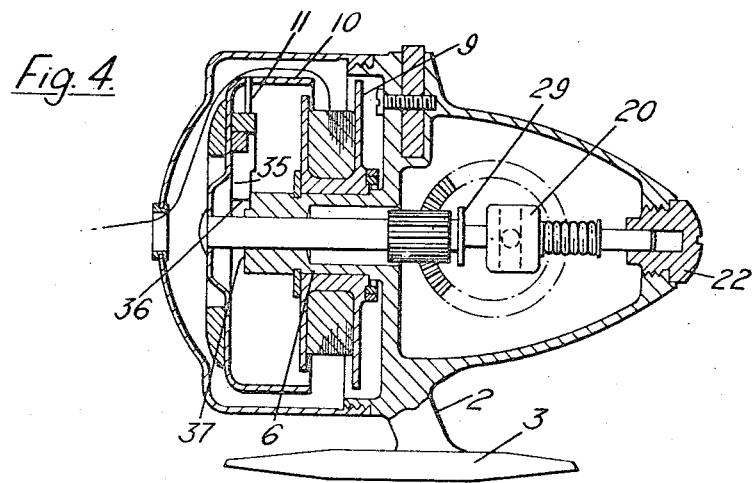
Figure 5:
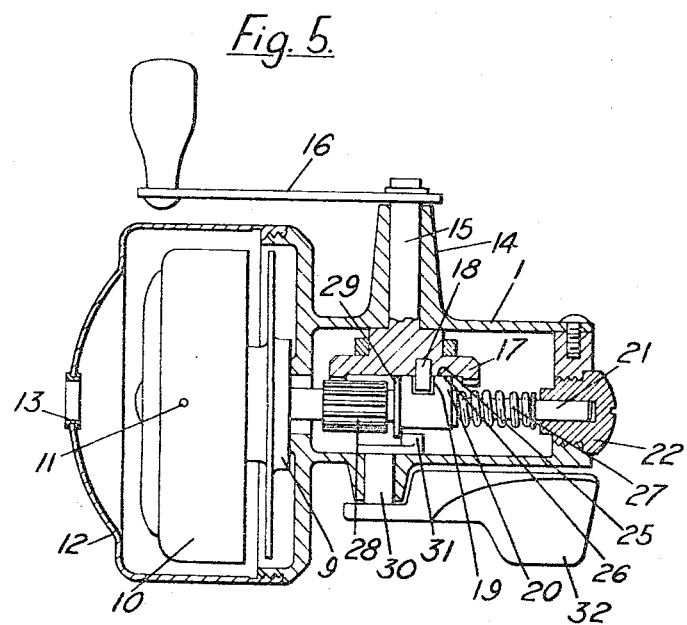
Figure 6:
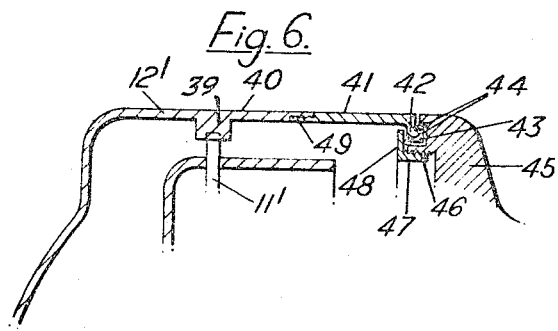

FIG. 3 shows a view in the direction indicated by the arrow A, FIG. 2, of part of the embodiment, FIG. 4 shows, in section like that of FIG. 2 a detail of the embodiment when in a casting position, FIG. 5 shows a sectional view on a plane through the embodiment at right angles to that in which the section of FIG. 2 is taken, FIG. 6 is a section like that of FIG. 2 of part of a second embodiment, and FIG. 7 is a view analogous to FIG. 5 but still of another embodiment.

FIG. 1 shows the main parts of the first embodiment of fishing reel in side view. It has a casing 1 with a stem 2 to which there is attached a shallow channel part 3 for binding onto the fishing rod in the usual way.

At the front of the casing 1 there is a rim 4 beyond which projects a screw-threaded flange 5.

A nose 6 projects beyond the rim 4 axially from the casing and has a groove 7 at about the middle of its length and on its end face an eccentric disc 8 to act as a cam.

A spool 9 is to be mounted over the nose 6 and secured on that nose by a circlip, so that it is held normally stationary by frictional engagement through an adjustable friction clutch and ratchet mechanism (not shown) with the casing 1.

A pickup member 10 is a cup which is to fit over the spool and this has a radially projecting pickup pin 11.

A cowl 12 for protecting the spool is also in the form of a cup having the internal surface of its rim screw-threaded for engagement with the screw-threaded flange 5, and having a hole surrounded by a beading 13 in the bottom of the cup which hole is to act as a guide for line from the spool.

The reel is shown assembled and in greater detail in FIGS. 2, 3 and 5: in these FIGS. it is in a condition for reeling in line.

The casing 1 has a boss 14, projecting at right angles to the nose 6 and stem 2, in which boss a drive shaft 15 is journaled. It is driven by a handle 16 and is fast at one end with a crown wheel 17. The crown wheel 17 has straight teeth, i.e. radial teeth. An antireverse pawl (not shown) engages a toothed wheel behind wheel 17.

A pin 18 is inset in the face of the crown wheel 17 and this engages a slot 19 in a yoke 20 which is slidably borne on a stem 21 which defines the axial direction of the reel as a whole. By this engagement the yoke 20 is reciprocated along the axis of the stem 21 when the crown wheel 17 rotates. Rotation of the yoke 20 is prevented by face-to-face abutment between faces 25 and 26 of the crown wheel and of the yoke respectively.

The stem is slidably supported at one end in a screw-threaded boss 22 engaging the casing 1, and at the other end is contained within a hollow shaft 23 which is journaled at 24 within the nose 6 of the casing.

A spring 27 is borne on the stem 21 and is interposed between the yoke 20 and a circlip 21a engaging a groove in the stem.

The shaft 23 is in itself rotatable about the stem 21 but is usually engaged by means of internal right-handed screw-threading to a screw-threaded nose 38 on a straight toothed wide pinion 28 which is fast with the stem 21. The pinion 28 is in driven engagement with the teeth of the pinion 17, so that when the shaft 23 is so engaged, it rotates with the shaft 21.

The gear 28 has a radially outwardly projecting flange 29 at one axial end and the rim of the axial end face of this flange 29 is to be engaged by a finger 31, rotatably borne in the casing 1 on a shaft 30 and movable by means of a thumbpiece 32 driving the shaft. The finger 31 being eccentric of the shaft 30, movements of the thumbpiece in rotation about the axis of rotation provided by the shaft 30 can cause axial movements of the flange 29 and hence of the pinion 28 and the shaft 23. The action of the spring 27 urges the axial end face of the flange against one end face of the yoke 20.

As shown in FIG. 2, the spool 9 is secured onto the nose 6 by circlip 33 engaging the slot 7. The end portion of the nose, bearing the eccentric cam disc 8 projects beyond the outer flange of the spool.

The pickup member 10 of the reel is borne on the end of the shaft 23 and is secured to it so that rotation of the shaft by rotation of the gears 17, 28, causes rotation of the pickup member.

The pickup member has an annular ridge 34 of firmly resilient material on its axially outer face.

The pickup pin 11 projects from the pickup member 10 near the base of the cup, to an extent sufficient to gather any line lying between the sidewall of the cup and the inner sidewall of the cowl 12. The pickup pin 11 is fast with a block 35 which is urged radially inwardly by a spring and is borne on the inside of the base of the cup of the pickup member 10 so as to be radially slidable in that cup. Radially innermost end 36 of the block is shaped to run on the cylindrical surface of the nose 6 where it is exposed beyond the spool 9. When the portion 36 is in engagement with that surface the pin 11 is projecting radially outward of the sidewall of the cup.

At the extreme end of the nose 6, there is provided the cam disc 8 which is eccentric of the axis of the shaft 23 and stem 21. The pickup member 10 is axially moved with the shaft 23 and stem 21 and the extreme upward limit of its axial throw is when the ridge 34 presses line against the inside face of the cowl 12 to brake the line. In the casting condition (FIG. 4) the block 35 just overlies the end of the nose 6 and can come into radial abutment with the cylindrical wall 37 of the cam disc 8. At one line in its circumference this wall 37 is exactly flush with the cylindrical surface of the nose 6.

In the operation of this spool, consider first the action of winding in line. The reel is in the condition shown in FIG. 2. A line is wound on the spool 9 and passes radially outwardly of that spool, over the outer face of the pickup member 10 to the guide defined by the bead 13 which when the reel is assembled lies on the axial line of the spool.

To reel in line the handle 16 is rotated and thereby the shaft 23 is rotated, rotating the pickup member, and the pin 11 catches the line and drags it round in rotation so that it is wound onto the spool 9. At the same time rotation of the crown wheel 17 causes motion of the cam pin 18 in a circular path and hence, since the spring 27 causes flange 29 to abut against one axial end face of the yoke 20, axial reciprocation is communicated to the pickup member 10. As it rotates therefore not only does the pickup member 10 wind line onto the spool but reciprocates axially relative to the nonrotating and nonreciprocating spool and distributes line across the axial length of the spool. The limits of the motion imparted to the pickup member 10 by the pin 18 are such that the block 35 does not pass off the end of the cylindrical surface of the nose 6 and hence the pin 11 remains radially outwardly.

If it is desired to cast off, the pin 11 must be retracted for otherwise line will not be able freely to leave the reel by spinning round the pickup member 10 to escape through the guide in the cowl, and also the rim of the cup-shaped pickup member 10 should be as free as possible from interfering with line running off the spool.

In the first step of a cast, the thumbpiece 32 is pressed so that the shaft 23 is pushed forward free of the yoke 20 and axially beyond the position shown in FIG. 4. To hold the line, the ridge 34 brakes the line by trapping it against the inside face of the cowl 12. The end 36 of the block 35 passes beyond the end of the nose 6 and the pin 11 is retracted by the spring which urges the block 35 inwardly. Then, to cast, the thumbpiece is released until the radially innermost end 36 abuts the end of the nose 6 (as shown in FIG. 4). The rim of the member 10 is aligned with the axially outer end plate of the spool 9, irrespective of the position at the time of the yoke 20, and the pin 11 remains retracted. Line can now be cast off the spool 9 without interference by the pin 11 and without having to make an acute bend as it bends over the edge of the member 10 and it flows outwardly by spinning freely round the pickup member 10 and out through the guide.

If it is desired to brake the cast, the thumbpiece can be depressed to move the pickup member axially outwardly again and cause the line to be caught again between the ridge 34 and the cowl 12.

The spring 27 acting through circlip 21a and stem 21, urges the block 35 axially back onto the end face either of the disc 37 or of the nose 6. Then, when an attempt to wind in the line is made by the handle 16 being rotated the block engages the cylindrical wall of the eccentric disc 37 and the pin 11 is pushed outwardly within one rotation and, when the end 36 of the block 35 is flush with the cylindrical surface of the remainder of the nose 6, the pickup member 10 is pushed axially towards the spool until such time as the flange 29 abuts the yoke 20 and the position in FIG. 2 is reached again, with reciprocation of the pickup member in the manner described.

Referring to FIG. 6 of the pickup pin 11' is extended outwardly radially so that, when it is in its pickup position as shown it mechanically interengages with a ring of teeth 39 on the internal periphery of the cowl 12'. The cowl 12' is made up of axially inner, 41, and outer, 40, parts screw-threadedly engaged together at 49. A flange 42, 43, on the part 41 is entrapped by a flange 48 of a screw-threaded ring 47 engaging a screw-threaded bush 46 on a portion 45 of the casing. Antifriction bearings 44 permit the cowl 12' to be rotatable about the same axis as the pickup member. When a fish is in play, the pickup 11' engages the cowl 12' and any rotation of the pickup is transmitted to that cowl. The fisherman may permit or prevent this rotation at will by pressing with his thumb or fingers on the smooth outside peripheral surface of the cowl 12'.

Axial elongation of the teeth 39 on the inside of the cowl 12' permits the reciprocation of the pickup 11.

Alternatively, a cowl such as 12 may be mounted on the central shaft 23 to be rotated by gearing means (but without any axial reciprocation). In this way there is achieved a coupling from the same drive mechanism as that of the pickup so that the two are constrained to rotate together, without any direct mechanical interengagement between the pickup and the inside of the cowl.

One embodiment having this feature is shown in FIG. 7 wherein parts the same as those in previous FIGS. have been given the same reference numerals. The reel has a drive and reciprocation mechanism for the line pickup, which drive and reciprocation mechanism is identical to that shown in FIG. 5 (not all of it being shown here however) with the exception that single crown gear 17 is replaced by double crown gear 50. One annulus 51 of gear teeth of the double crown gear 50 engages the pinion 28 which drives the line pickup 10 in rotation while a second annulus 52 of teeth engages cooperating teeth 53 on the rotatable cowl 54. The cowl 54 has two parts, the first being a generally conical shell part 55 having a cylindrical extension 56 which is screw-threadedly engaged to a cylindrical flange 57 of a dished base part 58 of the cowl. The conical portion 55 has a line guide aperture 57 which is fitted with a grommet 58. The line guide aperture 57 is coaxial with the spool 9.

The dished base 58 of the cowl has a radially inner cylindrical sleeve 59 which is rotatably borne on a nose 6 which surrounds and supports the shaft 23 (as best seen in FIGS. 2 and 4).

The radius of the annulus 52 of the teeth on the double gear 50 is greater than that of the annulus of teeth 51. However, the radius of the annulus of teeth 53 on the cowl is greater than the radius of the annulus of teeth on the pinion 28 by a compensating amount so that the cowl and the line pickup member 10 are driven in rotation in a 1:1 relationship.

I claim:

1. In a closed face fishing reel, in combination, a rotatable spool for fishing line; a rotatable line pickup; a rotatable cowl surrounding said line pickup with radial clearance; a line guide provided in said cowl for guiding fishing line into and out of said spool; and constraining means constraining said line pickup and said cowl for joint rotation.

2. In a fishing reel as defined in claim 1, said line pickup and said cowl having a common axis of rotation; and further comprising reciprocating means for reciprocating said line pickup lengthwise of said common axis in response to rotation of said line pickup about said axis.

3. In a fishing reel as defined in claim 1, wherein said constraining means comprises driven gear means respectively associated with said line pickup and said cowl, and drive gear means meshing with and driving said driven gear means.

4. In a fishing reel as defined in claim 2, wherein said line guide of said cowl is at least substantially coaxial with said common axis.

5. A closed face fishing reel having a spool for fishing line, an axis of the spool, a line pickup mounted adjacent the spool, the line pickup being rotatable and reciprocable about and along the axis of the spool, means for rotating the line pickup to wind line onto the spool, means for reciprocating the pickup automatically and coupled to the means for rotating the line pickup, a cowl rotatable about the axis of the spool and surrounding and protecting the line pickup and spool, a line guide in the cowl substantially axially of the spool, a path for line from the spool to the line guide being defined between a radially inner peripheral surface of the cowl on the one hand and the spool and line pickup on the other hand, and means constraining the line pickup and cowl to rotate together.

6. In a fishing reel as defined in claim 5, said cowl having an inwardly directed circumferential face surrounding said common axis; and wherein said constraining means comprises an annulus of teeth provided on said face and surrounding said line pickup, and at least one pickup pin provided on said line pickup and being shiftable radially of said common axis between a retracted position and a projected position in which latter it engages said annulus of teeth to thereby constrain said cowl for joint rotation with said line pickup.